（12） United States Patent
Ranga et al.

(10) Patent No.: US 9,689,342 B2
(45) Date of Patent: Jun. 27, 2017

(54) METHODS AND SYSTEMS FOR ADJUSTING A DIRECT FUEL INJECTOR

(71) Applicant: Ford Global Technologies, LLC, Dearborn, MI (US)

(72) Inventors: Adithya Pravarun Re Ranga, Canton, MI (US); Gopichandra Surnilla, West Bloomfield, MI (US); Mark Meinhart, South Lyon, MI (US); Joseph Lyle Thomas, Kimball, MI (US); Hao Zhang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 14/556,674

(22) Filed: Dec. 1, 2014

(65) Prior Publication Data
US 2016/0153391 A1 Jun. 2, 2016

(51) Int. Cl.
| F02D 41/40 | (2006.01) |
| F02M 65/00 | (2006.01) |
| F02B 3/12 | (2006.01) |
| F02D 41/08 | (2006.01) |
| F02D 41/14 | (2006.01) |
| F02D 41/24 | (2006.01) |
| F02D 41/26 | (2006.01) |
| F02D 41/38 | (2006.01) |

(52) U.S. Cl.
CPC ............ *F02D 41/402* (2013.01); *F02B 3/12* (2013.01); *F02D 41/08* (2013.01); *F02D 41/1454* (2013.01); *F02D 41/2438* (2013.01); *F02D 41/2467* (2013.01); *F02D 41/401* (2013.01); *F02M 65/001* (2013.01); *F02D 41/26* (2013.01); *F02D 2041/389* (2013.01); *Y02T 10/44* (2013.01)

(58) Field of Classification Search
CPC .. F02B 3/10; F02B 3/12; F02D 41/402; F02D 41/403; F02D 41/405; F02M 65/001
USPC .................. 123/299; 73/114.45, 114.48
See application file for complete search history.

(56) References Cited

U.S. PATENT DOCUMENTS

| 5,448,977 | A | 9/1995 | Smith et al. |
| 6,701,905 | B1 | 3/2004 | Gaskins |
| 6,847,881 | B2* | 1/2005 | Melbert .............. F02D 41/2096 |
| | | | 123/446 |
| 7,841,319 | B2 | 11/2010 | Thomas |
| 8,239,119 | B2 | 8/2012 | Bagnasco et al. |
| 8,260,526 | B2* | 9/2012 | Loeffler ................ F02D 35/023 |
| | | | 701/104 |

(Continued)

OTHER PUBLICATIONS

Parotto, Marco et al., "Advanced GDI Injector Control with Extended Dynamic Range," SAE Technical Paper Series No. 2013-01-0258, published Apr. 8, 2013, 9 pages.

(Continued)

*Primary Examiner* — Erick Solis
(74) *Attorney, Agent, or Firm* — Julia Voutyras; McCoy Russell LLP

(57) ABSTRACT

Systems and methods for improving fuel injection of an engine that includes a cylinder receiving fuel from a direct fuel injector are disclosed. In one example, a transfer function or gain of a direct fuel injector is adjusted in response to an exhaust lambda value and a first pulse width of two pulse widths provided to an injector of a cylinder during a cylinder cycle.

20 Claims, 5 Drawing Sheets

(56) References Cited

U.S. PATENT DOCUMENTS

| | | | |
|---|---|---|---|
| 8,290,687 B2 | 10/2012 | Olbrich et al. | |
| 8,700,288 B2 | 4/2014 | Huber et al. | |
| 9,002,621 B2* | 4/2015 | Hauser | F02D 41/008 123/299 |
| 2005/0172930 A1* | 8/2005 | Pitzal | F02D 41/1497 123/299 |
| 2006/0107936 A1* | 5/2006 | Mazet | F02D 41/20 123/672 |
| 2011/0202255 A1* | 8/2011 | Hauser | F02D 41/008 701/103 |
| 2012/0123703 A1* | 5/2012 | Serra | F02D 41/2432 702/47 |
| 2014/0033811 A1* | 2/2014 | Hoffmann | F02D 41/2096 73/114.49 |
| 2014/0318227 A1* | 10/2014 | Joos | F02D 41/221 73/114.45 |
| 2015/0122000 A1* | 5/2015 | Willimowski | F02M 51/00 73/114.45 |

OTHER PUBLICATIONS

Ranga, Adithya Pravarun Re et al., "Methods and Systems for Learning Variability of a Direct Fuel Injector," U.S. Appl. No. 14/556,615, filed Dec. 1, 2014, 35 pages.

Ranga, Adithya Pravarun Re et al., "Methods and Systems for Adjusting Fuel Injector Operation," U.S. Appl. No. 14/556,752, filed Dec. 1, 2014, 33 pages.

Ranga, Adithya Pravarun Re et al., "Methods and Systems for Adjusting a Direct Fuel Injector," U.S. Appl. No. 14/556,821, filed Dec. 1, 2014, 33 pages.

* cited by examiner

METHODS AND SYSTEMS FOR ADJUSTING A DIRECT FUEL INJECTOR

FIELD

The present description relates to a system and methods for adjusting operation of a direct fuel injector for an internal combustion engine.

BACKGROUND AND SUMMARY

Internal combustion engines may utilize direct fuel injection, wherein fuel is directly injected in to an engine cylinder to improve mixture preparation and to reduce cylinder charge temperatures. An amount of time a direct fuel injector is activated may be a function of fuel pressure supplied to the injector, engine speed and engine load. Therefore, at higher pressures, a fuel pulse width supplied to the injector may be adjusted to a short duration of time (e.g. less than 500 micro-seconds).

However, operating the fuel injector with short pulse widths may cause the injector to operate in a non-linear or ballistic region where the amount of fuel injected may vary substantially for small changes in the fuel pulse width. For example, the direct fuel injector may deliver less fuel than desired in the ballistic region where shorter pulse widths are applied to the fuel injector. Further, the variability in the ballistic region may not show a linear trend. Also, fuel injectors delivering fuel to the cylinder often have piece-to-piece and time-to-time variability, due to imperfect manufacturing processes and/or injector aging (e.g., clogging), for example. Consequently, injector variability may cause cylinder torque output imbalance due to the different amount of fuel injected into each cylinder, and may also cause higher tail pipe emission and reduced fuel economy due to an inability to correctly meter the fuel to be injected into each cylinder.

The inventors herein have recognized the above-mentioned disadvantages and have developed a method for a cylinder, comprising: during a learning condition, delivering a first pulse width and a second pulse width to a fuel injector supplying fuel to the cylinder during a cylinder cycle; varying a ratio of the first pulse width to the second pulse width; and determining an injector variability transfer function based on the ratio and an engine lambda value; and adjusting a control parameter of the injector based on the transfer function.

By supplying two pulse widths to a fuel injector during a cycle of a cylinder receiving fuel from the fuel injector, it may be possible to provide the technical result of adjusting a fuel injector transfer function or gain without having to operate the cylinder with an air-fuel ratio that may be leaner or richer than is desired. In particular, a first pulse width supplied to a fuel injector may be adjusted to be short enough in duration to operate the fuel injector in its non-linear low flow region. A second pulse width supplied to the fuel injector during a same cylinder cycle may be long enough to operate the fuel injector in its linear operating range so that a fuel amount closer to a desired fuel amount may be supplied to the cylinder during the cylinder cycle. Consequently, if fuel supplied by the fuel injector in response to the first pulse width is greater or less than a desired amount, the aggregate air-fuel mixture during the cylinder cycle may be less affected because a greater amount of a desired fuel amount to be injected to the cylinder may be provided via the second pulse width operating the fuel injector.

Further, a ratio of the first pulse width to the second pulse width (also referred to herein as a split-ratio) may be varied by decreasing the first pulse width and increasing the second pulse width. As the ratio is varied, a relative change in an engine lambda value from nominal may be measured. Due to injector variability resulting in significant errors in delivering fuel in the low pulse width operating regions, the relative change in the lambda value corresponds to the decrease in the first pulse width. Therefore, the relative change in the lambda value may be utilized to determine a correction factor which may be applied to a fuel injector transfer function. In this way, by sweeping the split-ratio and determining the change in lambda value from nominal, injector variability may be learned and applied to obtain a more accurate fuel injector transfer function.

The present description may provide several advantages. In particular, the approach may reduce engine air-fuel errors. Additionally, the approach may allow a fuel injector to be operated at pulse widths that were heretofore avoided because of non-linear fuel injector behavior. As such, this improves the operating range of the fuel injector. Further, the approach may reduce engine emissions and improve catalyst efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
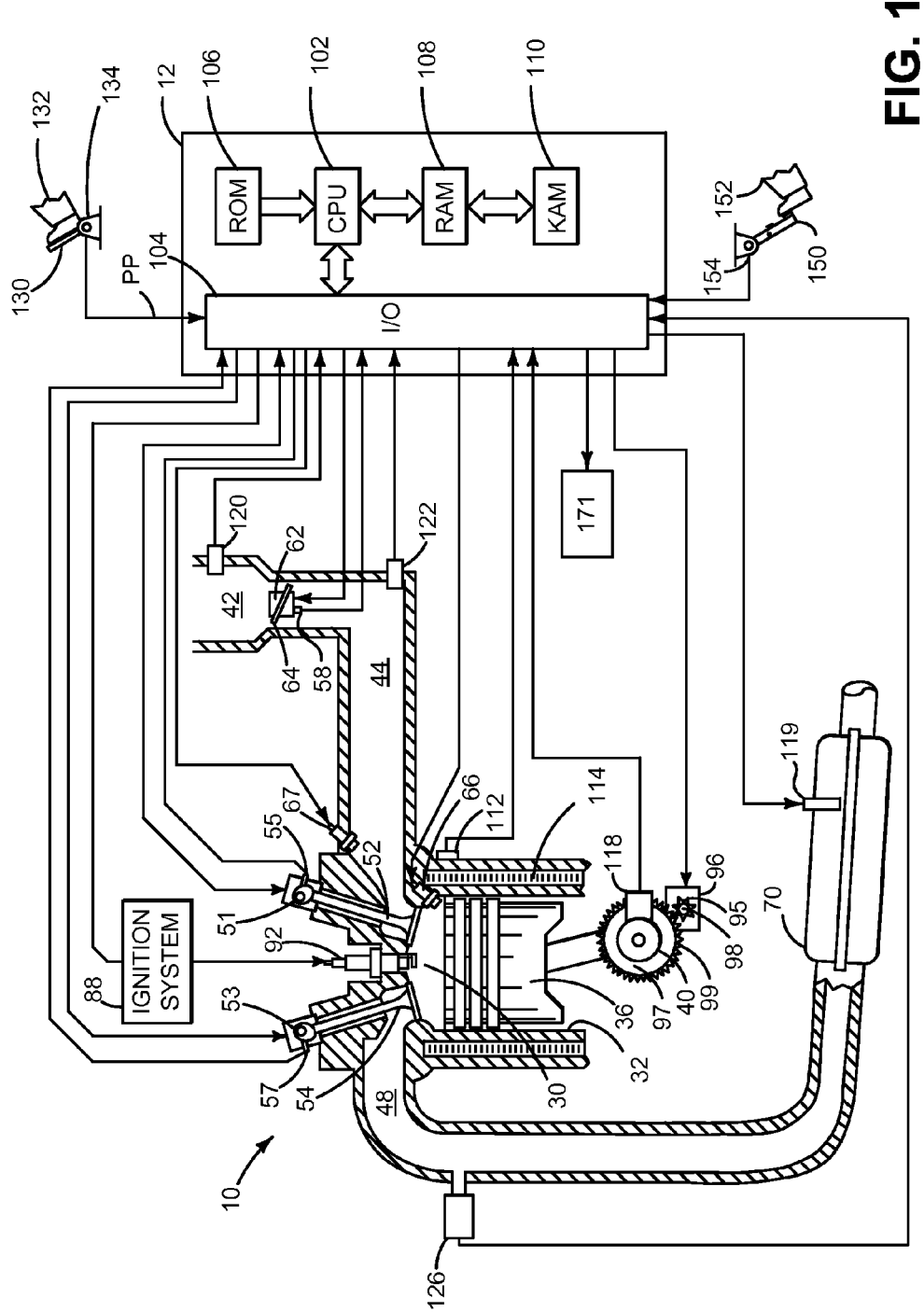
FIG. 1 is a schematic diagram of an engine.
Figure 3:
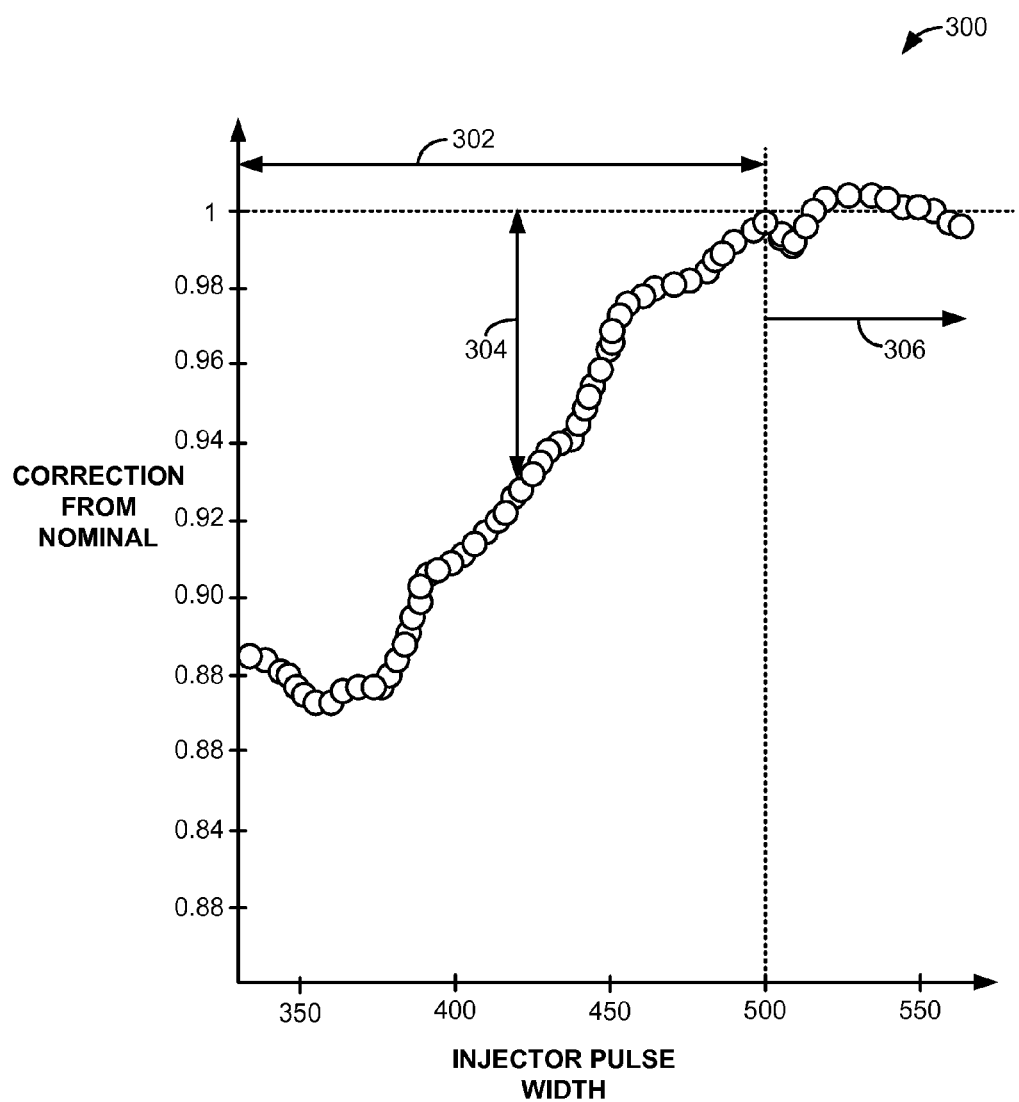
FIG. 3 shows a prophetic example plot of engine lambda versus fuel injector pulse width for a fuel injector operating in its ballistic operating region.
Figure 4:
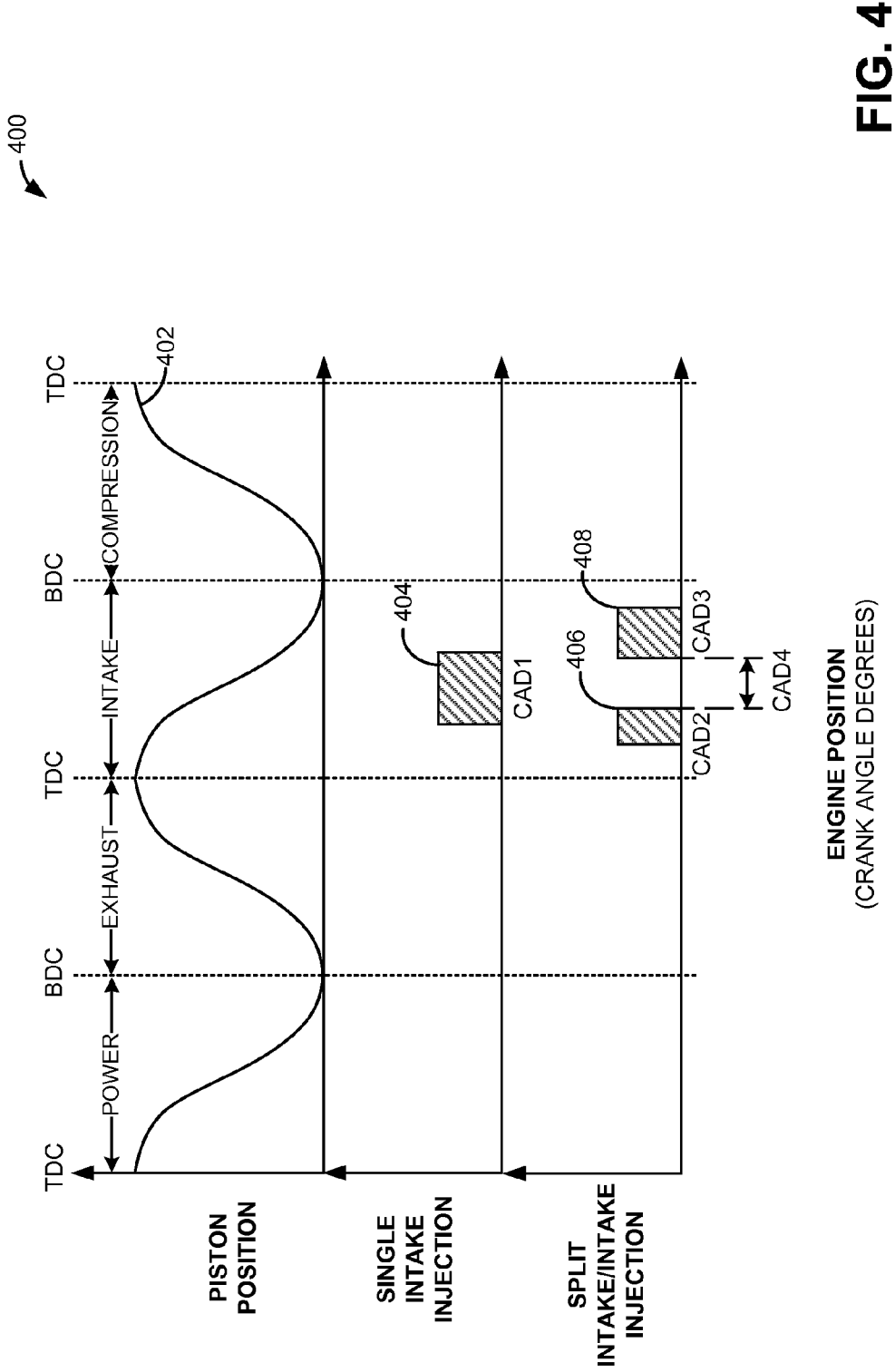
FIG. 4 shows an example split intake/intake injection in a cylinder cycle performed during injector variability learning according to the present disclosure.

The present description is related to correcting a fuel injector transfer function and operating fuel injectors based on the revised fuel injector transfer function. Fuel injectors may be incorporated into an engine as is shown in FIG. 1. The engine may be operated according to the method of FIG. 2 to update one or more fuel injector transfer functions. A fuel injector transfer function may be revised in a fuel injector's non-linear operating region based on engine lambda as is shown in FIG. 3. An engine may be operated as shown in the sequence of FIG. 4 according to the method of FIG. 2 to revise a fuel injector's transfer function.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 30, which is known to those skilled in the art as direct injection. Fuel injector 66 delivers liquid fuel in proportion to a voltage pulse width or fuel injector pulse width of a signal from controller 12. Fuel is delivered to fuel injector by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

A fuel injector transfer function that describes fuel injector flow or that describes an amount of fuel injected by the direct fuel injector based on a fuel injector pulse width may be characterized during a life cycle of the engine as described herein in order to reduce injector variability. For example, an amount of fuel injected by the fuel injector may be less than or greater than desired. In particular, in injector operating regions of low pulse width, there may be a significant difference between a desired fuel injection amount and the actual fuel injection amount. Further, the variability in the low pulse width region may not be linear. Therefore, it may be desirable to characterize fuel injector flow variability. The variability in the non-linear low flow regions may be learned by splitting a given fuel injection into two split fuel injections such that a first pulse width for delivering a first split fuel injection operates the injector in the non-linear operating region while a second pulse width for delivering a second split fuel injection operates the injector in a linear operating region. Further, a ratio of the split fuel injection may be varied such that the first pulse width is decreased and the second pulse width is increased. An engine lambda value measured varying the ratio of the two split fuel injections may be compared to a nominal lambda value obtained during single nominal fuel injection, and a fuel injector transfer function may be adjusted based on the change in lambda value from nominal and the pulse width delivered for the first split fuel injection. Details of learning fuel injector variability transfer function will be further described herein with respect to FIGS. 2-5.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine with multiple fuel injectors. Further, controller 12 may communicate conditions such as degradation of components to light, or alternatively, display panel 171.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
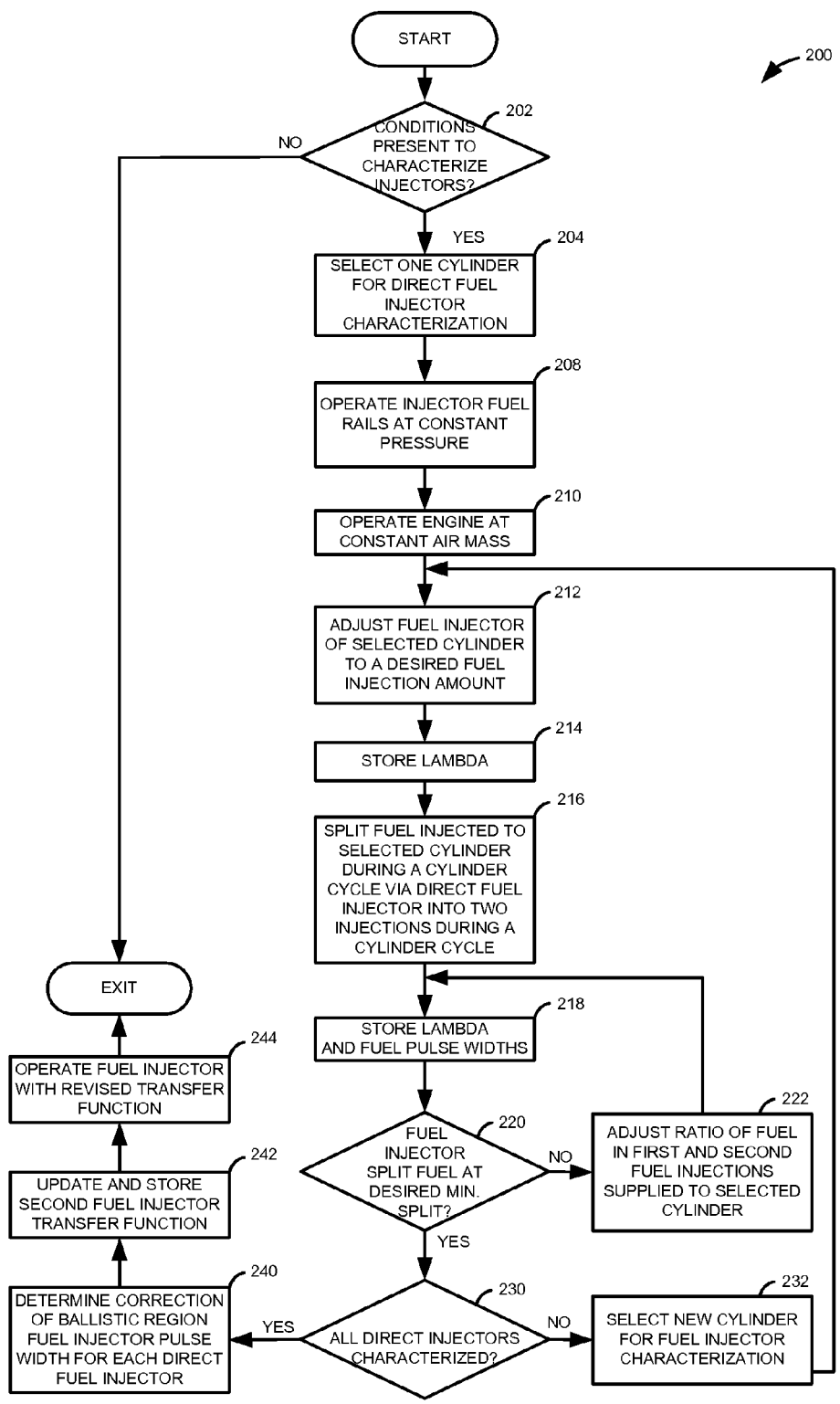
FIG. 2 shows a method for adjusting fuel injector operation.

Referring now to FIG. 2, a method for revising a fuel injector transfer function and operating an engine based on the revised transfer function is shown. The method of FIG. 2 may be included in the system of FIG. 1 as executable instructions stored in non-transitory memory. Further, the method of FIG. 2 may provide the operating sequence of FIG. 4.

At 202, method 200 judges if conditions are present for characterizing fuel injectors and adapting fuel injector operation. In one example, method 200 may judge that conditions are present for characterizing fuel injectors when an engine is idling with zero driver demand torque. In other examples, method 200 may judge that conditions are present for characterizing fuel injectors when the engine is operating at a constant engine speed and load, such as when a vehicle is in cruise control mode on a flat road. Further still, injector characterization may be initiated if a threshold duration has elapsed since a last characterization of the injectors. If method 200 judges that conditions are present for characterizing fuel injectors, the answer is yes and method 200 proceeds to 204.

At 204, method 200 selects one cylinder from a group of engine cylinders for direct fuel injector characterization. In other words, a direct fuel injector of a cylinder is selected to determine if the direct fuel injector transfer function accurately describes direct fuel injector operation or fuel flow. The direct fuel injector's gain or transfer function describes fuel flow through the direct fuel injector and/or an amount of fuel delivered via the direct fuel injector based on a pulse width of a voltage supplied to the direct fuel injector. In one example, method 200 begins by selecting a direct fuel injector of cylinder number one. However, in other examples, other cylinders may be selected. Method 200 proceeds to 208 after the cylinder is selected.

At 208, method 200 supplies fuel to direct fuel injector rails at a constant pressure. By supplying fuel to the fuel rails at a constant pressure, it may be possible to more accurately characterize fuel injector fuel flow rate and amount of fuel injected. Method 200 proceeds to 210 after fuel at constant pressure is supplied to the fuel rails.

At 210, method 200 operates the engine with a constant air mass. The engine may be operated with a constant air mass via adjusting a position of a throttle or other air control device as engine speed changes. If engine speed remains constant, the position of the air mass adjusting device may remain unchanged. The constant air mass may be a predetermined amount such as an air amount to idle the engine or an air amount to maintain a constant vehicle speed at present vehicle operating conditions. By operating the engine with a constant air mass, it may be possible to ascertain fuel injector fuel delivery errors more accurately since the engine's air-fuel ratio may be less likely to change from air charge errors. Method 200 proceeds to 212 after beginning to operate the engine with a constant air mass.

At 212, method 200 adjusts a fuel injector supplying fuel to the selected cylinder to deliver a desired fuel amount during an intake stroke of a cylinder cycle. The desired fuel amount may be an amount of fuel delivered to the cylinder during the cylinder cycle of the selected cylinder in order to obtain a desired engine air-fuel ratio. Method 200 proceeds to 214 after the desired fuel amount of the first fuel inject is selected and applied. While the direct fuel injector of the cylinder is being characterized, direct fuel injectors of the remaining cylinders may be operated to deliver a single fuel injection supplying a desired fuel injection amount to obtain the desired engine air-fuel ratio.

At 214, method 200 determines the lambda value the engine is operating at based on output from an exhaust gas oxygen sensor. The lambda value is the engine's present air-fuel ratio divided by the stoichiometric air fuel ratio (e.g., 14.3/14.64=0.977). The oxygen sensor outputs a voltage that is converted to engine air-fuel ratio via an oxygen sensor transfer function. The present value of lambda is stored to controller memory. Method 200 proceeds to 216 after the lambda value is stored to memory.

At 216, method 200 splits the amount of fuel injected to the selected cylinder via the fuel injector into two fuel injections during a cycle of the selected cylinder. The two injections are provided by supplying the fuel injector two voltage pulse widths or injection pulse widths. In one example, the amount of fuel commanded in the two pulse widths adds up to an amount of fuel that when combined with the selected cylinder's air amount is based on providing a lambda value of one in the selected cylinder. For example, if X grams of fuel are needed to operate the selected cylinder at a lambda value of one, then the amount of fuel injected via the first and second pulse widths is desired to be X. Consequently, the amount of fuel injected by the fuel injector may be a first amount 0.5·X, and a second amount 0.5·X, when the first fuel injection amount provided by the first pulse width is equal to the second fuel injection amount provided by the second pulse width, the first and second pulse widths provided to the fuel injector (e.g., the direct fuel injector). Thus, in this example, the amount of fuel injected based on the first pulse width supplied to the fuel injector is fifty percent of the total fuel injected by the fuel injector during the cylinder cycle. The amount of fuel injected based on the second pulse width supplied to the fuel injector is also fifty percent of the total fuel injected by the direct fuel injector during the cylinder cycle. It should be noted that the example provided herein is only exemplary. The first and second fuel injections may be adjusted between zero and one hundred percent for the first injection or vice versa.

In one example, a minimum separation (di_min crank angle degrees) may be provided between the first and the second fuel injection. For example, if the first injection is delivered at a first start of injection timing of 420 crank angle degrees, the second injection may be delivered at a second start of injection timing of 420+di_min crank angle degrees. Method 200 proceeds to 218 after the first and second pulse widths provided to the fuel injector of the selected cylinder are adjusted to a predetermined split of fuel delivered between the two pulse widths.

At 218, method 200 determines the lambda value the engine is operating at based on output from an exhaust gas oxygen sensor. The lambda value is the engine's present air-fuel ratio divided by the stoichiometric air fuel ratio. The oxygen sensor outputs a voltage that is converted to engine air-fuel ratio via an oxygen sensor transfer function. The present value of lambda is stored to controller memory. Additionally, the fuel injector's two pulse widths may also be stored to memory. Errors between the fuel injector's shortest pulse width (e.g., the first pulse width) for delivering the desired engine air-fuel ratio and the lambda value observed by the exhaust oxygen sensor may provide indications of errors in the fuel injectors transfer function in the fuel injector's ballistic operating region. Injector pulse widths that are greater than a pulse width that operates the direct fuel injector in a linear mode are expected to have a smaller effect on lambda errors. Method 200 proceeds to 220 after the lambda value is stored to memory.

At 220, method 200 judges if a first pulse width supplied to the fuel injector during a cylinder cycle is at a minimum desired pulse width. In one example, the minimum desired pulse width is a pulse width of a first pulse width supplied to the fuel injector during a cycle of the selected cylinder. However, in other examples, the minimum desired pulse width is a pulse width of a second pulse width supplied to the fuel injector during a cycle of the selected cylinder. The minimum pulse width may be a predetermined value such as 100 micro-seconds. The minimum pulse width is a pulse width that operates the fuel injector in its non-linear or ballistic operating region where fuel flow through the direct fuel injector is non-linear.

In some examples, it may be determined if a ratio of the first pulse width to the second pulse width (that is, split-ratio) is at a threshold ratio, wherein the threshold ratio may be based on a minimum value of the first pulse width.

If method 200 judges that the first or second pulse width supplied to the fuel injector (e.g., the direct fuel injector) is less than a threshold pulse width, if the answer is yes method 200 proceeds to 230. Otherwise, the answer is no and method 200 proceeds to 222.

At 222, method 200 decreases the first pulse width provided to the fuel injector during a cycle of the selected cylinder and increases the second pulse width provided to the fuel injector during the cycle of the selected cylinder. In other words, a ratio of the first pulse width to the second pulse width (that is, split-ratio) may be decreased. By decreasing the first pulse width, the fuel injector is commanded to inject less fuel and to operate closer to or deeper into a non-linear operating range of the direct fuel injector during the cylinder cycle. Increasing the second pulse width commands the fuel injector to inject more fuel and to operate further away from the non-linear operating range of the fuel injector during the cylinder cycle. Thus, the first pulse width drives the fuel injector to operate the fuel injector closer to or deeper into the fuel injector's non-linear operating region during a cylinder cycle. After the first pulse width is delivered to the fuel injector, the second pulse width is supplied to the fuel injector during the same cylinder cycle. The second fuel pulse width operates the s fuel injector further into the linear operating range of the direct fuel injector. Further, the amount of fuel removed from the first fuel injection during the cylinder cycle by reducing the first pulse width is added to the second fuel injection amount during the cylinder cycle by increasing the second pulse width. In this way, the fuel injector may be driven into its non-linear operating range in a way that reduces engine fueling errors yet provides ability to determine fuel injector fueling errors. Method 200 returns to 218 to record the effects of adjusting the fuel pulse widths applied to the fuel injector of the selected cylinder.

At 230, method 200 judges whether or not operation of all the engine's direct fuel injectors have been characterized. If operation of all direct fuel injectors has not been characterized, the answer is no and method 200 proceeds to 232. Otherwise, the answer is yes and method 200 proceeds to 240.

At 232, method 200 selects a new cylinder from the cylinders that have not had their fuel injectors (e.g., direct fuel injectors) characterized. For example, if cylinder number one has had its fuel injector supplying fuel characterized, cylinder number two is selected. In some examples, the sequence of cylinders selected for characterization may be based on the firing order. Additionally, the previously selected cylinder is operated in a normal mode without split-fuel injection. That is, the previously selected cylinder may be operated such that the desired amount of fuel may be delivered in one single fuel injection. Method 200 returns to 212 after a new cylinder is selected for fuel injector characterization.

At 240, method 200 determines corrections for ballistic or non-linear regions of fuel injectors of all engine cylinders. The corrections are made to nominal pulse widths (e.g., existing transfer function values) of the fuel injector at the pulse widths the fuel injector operated at in steps 218 to 222 during the time the fuel injection split ratio was adjusted. In one example, the fuel pulse width correction may be determined via the following equation:

$$\text{Total \% reduction} = \frac{\% \text{ change\_in\_lambda\_at\_the\_pw\_from\_nom}^* \text{num\_cylinders\_per\_bank}}{\text{di\_split\_ratio}}$$

where Total % reduction is the correction applied to the transfer function of the direct fuel injector of the selected cylinder at a particular fuel injector pulse width, % change_in_lambda_at_the_pw_from_nom is the percent change in the observed lambda value for the complete bank at the particular pulse width from the lambda value of the bank at the fuel pulse width applied when the fuel injector is supplied fuel based on the initial pulse width (e.g., lambda value at 214), num_cylinders_per_bank is the number of cylinders present on the bank (e.g. a V6 engine may have 3 cylinders per bank, and an I4 engine may have 4 cylinders in one bank) and di_split_ratio is the ratio between the first fuel pulse width and the second fuel pulse width supplied to the fuel injector (e.g., direct fuel injector) of the selected cylinder. The correction may be determined for and applied to all fuel injectors of the selected cylinders based on lambda values and pulse widths stored at 218. Thus, the corrections may be applied to all fuel injectors of all engine cylinders.

In one example, the direct fuel injector's pulse width for a V6 engine is one millisecond before being split (e.g., at 212), and after the 1 millisecond pulse width is split into a first pulse width of 0.34 milliseconds and a second pulse width of 0.66 milliseconds the split ratio is 0.34. If the lambda value for the bank decreased by 7 percent during the split injection compared to nominal (that is, during the single injection prior to the split), then the total reduction is 7*3/(0.34), or the 7 percent divide by the split ratio and multiplied by number of cylinders on that bank (3 because it is a V6). The transfer function for the commanded pulse width for these operating conditions is adjusted by ~61.7 percent. Method 200 performs similar adjustments to the direct fuel injector's transfer function at all pulse widths the fuel injector was operated at between steps 218 and 222.

At 242, the values stored in a table or function that represents the transfer function of the fuel injector are revised by multiplying values stored in the transfer function by the corresponding injector correction determined at 240 and storing the result back into the fuel injector transfer function. For example, if the fuel injector transfer function describes the fuel injector's flow at the 400 micro-second pulse width as Z, and the correction determined at 240 for the 400 micro-second pulse width is 10%, the revised value stored in the fuel injector's transfer function is 0.1·Z. Revisions for when the fuel injector is provided pulse widths other than 400 micro-seconds are also performed for each decrement in fuel pulse width performed at 222. Likewise, revisions for transfer functions of other cylinder's fuel injectors may be performed similarly. In cases where a single transfer function describes operation of all the engine's cylinders fuel injectors, the single transfer function is adjusted similarly. Method 200 stores the revised transfer function or functions in memory and proceeds to 244.

At 244, method 200 operates the engine via supplying fuel to engine cylinders based on the revised and stored direct fuel injector transfer functions. For example, pulse widths are provided to each engine cylinder's direct fuel injector, the pulse widths are based on a desired fuel mass to be delivered to a cylinder during a cycle of the cylinder and the transfer function that outputs a fuel injector pulse width according to a desired mass of fuel to be injected to the cylinder. Method 200 proceeds to exit after engine cylinders are operated in response to one or more revised direct fuel injector transfer functions.

Consequently, the method of FIG. 2 provides for a method for a cylinder, comprising: during a learning condition, delivering a first pulse width and a second pulse width to a fuel injector supplying fuel to the cylinder during a cylinder cycle; varying a ratio of the first pulse width to the second pulse width; and determining an injector variability transfer function based on the ratio and an engine lambda value; and adjusting a control parameter of the injector based on the transfer function, wherein the control parameter of the fuel injector is a fuel injector gain.

The method further includes varying the ratio by decreasing the first pulse width and increasing the second pulse width, wherein the second pulse width is greater than the first pulse width, and wherein the first pulse width is supplied to the injector for delivering a first fuel injection, and the second pulse width is supplied to the injector for delivering a second fuel injection. Further, the method includes the first pulse width operating the injector in a ballistic region where flow through the injector is non-linear, and the second pulse width operating the injector in a non-ballistic region. Still further, the method includes the fuel injector being a direct fuel injector, wherein the first and the second pulse widths are based on obtaining a stoichiometric engine lambda value of one.

The method further includes the first fuel injection delivered prior to the second fuel injection, wherein the first and the second fuel injections are separated by a minimum crank angle degree, wherein the cylinder is in the engine, wherein during the learning condition, the engine is operated at a constant speed and air mass and wherein the first and the second fuel injections are performed at constant rail pressure during the learning.

In some examples, a method for fueling a cylinder may comprise: during the learning condition, varying a fuel injector rail pressure, and at each rail pressure, varying the ratio of the first pulse width to the second pulse width, measuring the engine lambda value for each ratio, and determining a direct fuel injector variability transfer function based on the rail pressure, the ratio and the engine lambda value.

In some other examples, a method for operating a fuel injector fueling a cylinder included in an engine comprises: during a first condition when the engine is operating at a constant speed and air mass, splitting a desired fuel injection amount into a first fuel fraction and a second fuel fraction; operating a fuel injector at a first pulse width to deliver the first fuel fraction at a first injection timing; and operating the fuel injector at a second pulse width to deliver the second fraction at a second injection timing later than the first injection timing during a cylinder cycle; and during subsequent cylinder cycles occurring after the cylinder cycle, decreasing a ratio of the first pulse width to the second pulse width by a predetermined amount until a threshold ratio is reached while maintaining the desired fuel injection amount; measuring an engine lambda value during each cylinder cycle; and learning a fuel injector transfer function based on the lambda value and the ratio. The method further comprises during a second condition, adjusting a control parameter of the fuel injector based on the learnt transfer function; and wherein, the second condition is based on one or more of a current engine speed, current engine load, and current torque demand. The method further comprises operating the fuel injector at a constant rail pressure during the first condition.

The method includes the desired fuel injection amount being based on providing a cylinder air-to-fuel ratio to obtain an engine lambda value of one, wherein the fuel injector is a direct fuel injector, wherein decreasing the ratio is performed by decreasing the first pulse width and increasing the second pulse width, and wherein when delivering the first pulse width, the fuel injector operates in a ballistic region, and when delivering the second pulse width, the fuel injector operates in a non-ballistic region; and wherein the first pulse width and the second pulse width are separated by a crank angle degree.

Referring now to FIG. 3, an example plot of a fuel injector correction amount versus fuel injector pulse width for a fuel injector operating in a non-linear or ballistic region is shown. The fuel injectors shown in FIG. 1 may operate similar to the way shown in FIG. 3.

The X axis represents fuel injector pulse width. A fuel injector pulse width may vary in duration from zero to tens of milliseconds. The Y axis represents a fuel flow correction from a nominal fuel injector flow rate. A nominal correction has a value of 1. When the fuel injector flow is less than nominal, the correction factor is a fraction of nominal (e.g., 0.8). The correction may be applied as one divide by 0.8 (that is, 1/0.8). When the fuel injector flow is more than the nominal, the correction factor may be more than 1 (e.g., 1.1). The circles represent individual data values for different fuel injector pulse widths.

In this example, the fuel injector begins to operate in a non-linear or ballistic range when fuel pulse widths are less than about 500 micro-seconds. This range is indicated by leader 302. At higher or longer pulse widths, the fuel injector flow is a nominal amount as indicated by the value of one when fuel injector pulse widths are greater than 500 micro-seconds. This range is indicated by leader 306. When the fuel injector described by plot 300 is operated with a 420 micro-second pulse width, fuel injector flow is about 0.93 of nominal fuel injector flow rate as indicated by leader 304, which indicates that as in the injector is operated in the low pulse width region the amount of fueling decreases by a greater extent than what it is expected. Thus, the fuel flow rate of this particular fuel injector is decreased (prior to applying the correction) when the fuel injector is supplied a 420 micro-second injection pulse. That is, at 420 micro-seconds the fueling is 93% compared to the nominal (100%) for the particular injector. This indicates that when a fuel flow of 1 is requested for the injector at 420 micro-seconds, the actual delivery by the injector is 0.93. Hence the correction factor is 0.93 and a 1/correction factor (that is, 1/0.93=1.075) times fuel may be applied to operate the injector at nominal flow of 1.

The correction factor is reduced further in response to fuel injector pulse widths that are less than 420 micro-seconds. At fuel injector pulse widths greater than 500 micro seconds, the correction from nominal is one (e.g., no correction). The fuel injector's nominal flow rate may be multiplied by the correction to provide the injector's fuel flow rate when a particular pulse width is applied to the fuel injector.

A plurality of correction values shown in FIG. 3 may be stored in a table or function as a transfer function for a fuel injector. The correction values may be revised or updated according to the method of FIG. 2. Thus, it may be possible to describe fuel injector flow in a fuel injector's ballistic operating range where the fuel injector may exhibit non-linear flow.

Turning to FIG. 4, an example fuel injection profile that may be utilized to characterize a fuel injector (e.g., a direct fuel injector) of a cylinder selected for fuel injector characterization is shown. Specifically, FIG. 4 shows a map 400 of piston position, with respect to an engine position, for the engine cylinder. Further, map 400 illustrates an engine position along the x-axis in crank angle degrees (CAD). Curve 402 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 402, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

The second plot (from the top) of map 400 depicts an example fuel injection profile 404 that may utilized for the selected cylinder before being split (e.g. at step 212 of FIG. 2). For example, fuel injection profile 404 may be utilized for a nominal fuel injection, where a single fuel injection is utilized to deliver a desired amount of fuel in order to obtain a desired engine air-fuel ratio.

The third plot from the top of map 400 depicts an example split fuel injection profile for the selected cylinder after splitting. For example, the split fuel injection profile may be utilized in response to a request to characterize the direct fuel injector.

An engine controller (e.g., controller 12 at FIG. 1) may be configured to provide the desired amount of fuel to the cylinder as a first single direct injection depicted at 404. The first single injection 404 may include a desired amount of fuel injected at a first timing CAD1. The desired amount of fuel may be injected to obtain a desired engine air-fuel ratio. The engine lambda value obtained in response to the first single injection may be a nominal lambda value.

Further, the controller may be configured to provide a first split fuel injection depicted at 406, and a second split injection depicted at 408 in response to a request to characterize the fuel injector. That is, in response to a request to characterize the fuel injector, the desired amount of fuel may be split into a first split fuel amount which may be direct injected as a first intake stroke injection at CAD2, and a second split fuel amount which may be direct injected as a second intake stroke injection at CAD3. Further, the engine lambda value may be measured during the cylinder cycle when the split injection is performed. The first split fuel injection and the second split fuel injection may be separated by a minimum crank angle degree CAD4. Further, a first pulse width of a voltage delivered to the injector for the first split fuel injection may be less than a second pulse width of a voltage delivered to the injector for the second fuel injection. Still further, a ratio of the first pulse width to the second pulse width may be decreased so as to drive the fuel injector to operate in the non-linear region during the first fuel injection. The lambda value determined during the split-injection may be compared to the nominal lambda value obtained before the split injection. A change in lambda valve from nominal may be utilized to determine a correction factor for the fuel injector transfer function.

In this way, by splitting the desired fuel injection amount into the first split fuel injection and the second split fuel injection, and determining a corresponding change in the engine lambda, a correction factor for adjusting a transfer function of the injector for operation in the non-linear low flow operating regions may be obtained.

Figure 5:
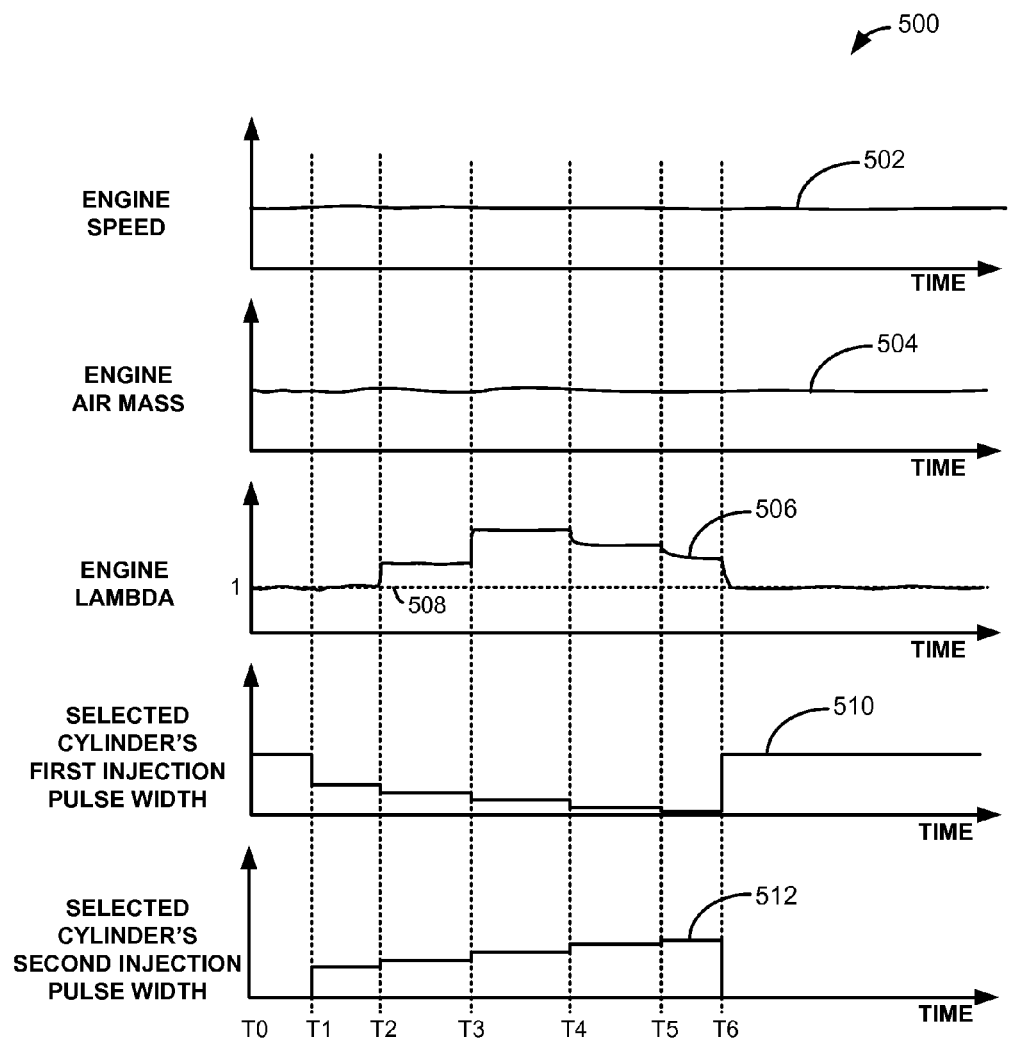
FIG. 5 shows a fuel injector operating sequence for adjusting fuel injector operation according to the method of FIG. 2.

Referring now to FIG. 5, a fuel injector operating sequence for adjusting fuel injection according to the method of FIG. 2 is shown. Vertical markers T1-T6 represent times of interest during the sequence. FIG. 5 illustrates example engine speed at plot 502, engine air mass at plot 504, engine lambda at plot 506, first pulse width of a cylinder selected for fuel injector characterization at plot 510, and second pulse width of the selected cylinder at plot 512. In all the plots discussed at FIG. 5, the X axis represents time and time increases from the left side of the plot to the right side of the plot.

The first plot from the top of FIG. 5 is a plot of engine speed versus time. The Y axis represents engine speed and engine speed increases in the direction of the Y axis arrow.

The second plot from the top of FIG. 4 is a plot of engine air mass versus time. The Y axis represents engine air mass (e.g., air flow through the engine) and engine air mass increases in the direction of the Y axis arrow.

The third plot from the top of FIG. 4 is a plot of engine lambda versus time. The Y axis represents engine lambda and engine lambda increases in the direction of the Y axis arrow.

The fourth plot from the top of FIG. 4 is a plot of a first pulse width supplied to a direct fuel injector of the selected cylinder during a cycle of the selected cylinder versus time. The Y axis represents the first fuel pulse width and the first fuel pulse width increases in the direction of the Y axis arrow.

The fifth plot from the top of FIG. 4 is a plot of a second fuel pulse width supplied to the direct fuel injector of the selected cylinder during a cycle of the selected cylinder versus time. The Y axis represents the second fuel pulse width and the second fuel pulse width increases in the direction of the Y axis arrow.

At time T0, the engine is operating at a constant engine speed with a constant air mass. The engine lambda value is one (e.g., the desired lambda value). The first pulse width provided to the direct fuel injector during a cycle of the selected cylinder receiving the fuel is at a middle level. The second pulse width provided to the direct fuel injector during the same cycle of the cylinder receiving the fuel is zero indicating that only one fuel pulse width is supplied to the fuel injector during the cylinder cycle.

At time T1, the engine speed and air mass remain at their respective constant values. The first pulse width supplied to the selected cylinder is decreased in response to a request to characterize the direct fuel injector. The second pulse width supplied to the selected cylinder is increased in response to the request to characterize the direct fuel injector. The first pulse width and the second pulse width are longer than a pulse width for entering the direct fuel injector's ballistic operating region where fuel injector flow is non-linear. The engine lambda value is steady at a value of one. The engine lambda value and the direct fuel injector pulse widths are stored to memory a short time after time T1 and before time T2.

At time T2, the engine speed and air mass continue to remain at their respective constant values. The first pulse width supplied to the selected cylinder is decreased further in response to the first fuel pulse width not being at a minimum value. The second pulse width supplied to the selected cylinder is also increased in response to the first fuel pulse width not being at the minimum value. The first fuel pulse width is short enough for the direct fuel injector to enter a non-linear or ballistic operating mode where fuel flow through the direct fuel injector may be non-linear. The engine lambda value increases indicating that the first fuel pulse width not supplying a desired amount of fuel and the fuel injector is in the ballistic region. The increased lambda value indicates that the direct fuel injector transfer function is providing a fuel pulse to the direct fuel injector resulting in a leaner air-fuel ratio than desired. The engine lambda value and the direct fuel injector pulse width are stored to memory a short time after time T2 and before time T3.

At time T3, the engine speed and air mass continue to remain at their respective constant values. The first pulse width supplied to the selected cylinder is decreased further in response to the first fuel pulse width not being at a minimum value. The second pulse width supplied to the selected cylinder is also increased in response to the first fuel pulse width not being at the minimum value. The first fuel pulse width drives the direct fuel injector to operate deeper in the direct fuel injector's non-linear operating region. The engine lambda value increases still more indicating that the first fuel pulse width is still in the ballistic region. The increased lambda value indicates that the direct fuel injector transfer function is providing a fuel pulse to the direct fuel injector resulting in a leaner air-fuel ratio than desired. The engine lambda value and the direct fuel injector pulse widths are stored to memory a short time after time T3 and before time T4.

At time T4, the engine speed and air mass continue to remain at their respective constant values. The first pulse width supplied to the selected cylinder is decreased further in response to the first fuel pulse width not being at a minimum value. The second pulse width supplied to the selected cylinder is also increased in response to the first fuel pulse width not being at the minimum value. The first fuel pulse width drives the direct fuel injector to operate even deeper in the direct fuel injector's non-linear operating region. The engine lambda value decreases a small amount indicating that the direct fuel injector's transfer function is providing a first fuel pulse width that is closer to the desired value that provides a lambda value of one. The lambda value indicates that the direct fuel injector transfer function needs to be corrected at shorter pulse widths of the first pulse width provided during the selected cylinder's cylinder cycle. The engine lambda value and the direct fuel injector pulse widths are stored to memory a short time after time T4 and before time T5.

At time T5, the engine speed and air mass continue to remain at their respective constant values and the first pulse width supplied to the selected cylinder is decreased further in response to the first fuel pulse width not being at a minimum value. The second pulse width supplied to the selected cylinder is also increased in response to the first fuel pulse width not being at the minimum value. The first fuel pulse width drives the direct fuel injector to operate still deeper in the direct fuel injector's non-linear operating region. The engine lambda value decreases a small amount indicating that the direct fuel injector's transfer function is providing a first fuel pulse width that is closer to the desired value that provides a lambda value of one. The lambda value indicates that the direct fuel injector transfer function needs to be corrected at shorter pulse widths of the first pulse width provided during the selected cylinder's cylinder cycle. The engine lambda value and the direct fuel injector pulse width are stored to memory a short time after time T5 and before time T6.

At time T6, the engine speed and air mass continue to remain at their respective constant values. The direct fuel injector is operated only based on a first pulse width provided to the direct fuel injector during the cylinder's cycle in response to the direct fuel injector pulse width having been reduced to a minimum value. The second fuel pulse width provided to the direct fuel injector is eliminated in response to the first pulse width having been reduced to a minimum value. The lambda value converges back to a value of one. The first direct fuel injector pulse width is a value that operates the direct fuel injector in a linear region that is outside of the ballistic region.

After time T6, the direct fuel injector transfer function may be adjusted to improve the transfer functions characterization of direct fuel injector operation. In one example, the entries in the direct fuel injection transfer function may be adjusted by multiplying present values in the direct injector transfer function by a correction value that is based on the change in engine lambda from a nominal value as is described in the method of FIG. 2. The direct fuel injectors may be subsequently operated based on the revised transfer function.

In one example, the sequence of FIG. 5 may be provided according to the method of FIG. 2 in a system, comprising: an engine including a cylinder; a direct fuel injector in fluidic communication with the cylinder; and a controller including executable instructions stored in non-transitory memory for commanding the engine to operate at a constant air-fuel ratio while supplying fuel to the cylinder via the direct fuel injector, additional instructions for providing two injections of fuel via the direct fuel injector in response to a request to adjust a control parameter such as a fuel injector gain or a transfer function of the direct fuel injector.

The system may further comprise additional instructions to decrease a first injection amount provided by the direct fuel injector and increase a second fuel injection amount provided by the direct fuel injector in response to the request to adjust the control parameter, wherein the transfer function or gain is adjusted based on an exhaust lambda.

Still further, the system may further comprise additional instructions to adjust the transfer function or gain by comparing the exhaust lambda of the cylinder cycle when the split injection (including the first and the second fuel injection) was performed to a nominal exhaust lambda of a cylinder cycle when only one injection was performed during the cylinder cycle.

In one example, a method for a cylinder including a direct fuel injector, comprises: during a learning condition, comparing a first UEGO output of a nominal fuel injection without split-ratio and a second UEGO output of a split-ratio fuel injection to determine a transfer function correction factor for the fuel injector in the cylinder; and adjusting a fuel injector parameter based on the determined correction factor; wherein the fuel injector parameter is a fuel injector transfer function.

The method further comprises varying the split-ratio by decreasing a first fuel injection fraction of the split-ratio injection and increasing a second fuel injection fraction of the split-ratio injection during the learning, the first fuel injection fraction delivered prior to the second fuel injection fraction, and separated by a minimum crank angle degree.

The method includes the direct fuel injector operating in a ballistic region to deliver the first fuel injection fraction, and the direct fuel injector operating in a non-ballistic region to deliver the second fuel injection fraction.

It must be appreciated that while the examples discussed herein describe learning fuel injector transfer function in an engine equipped with direct fuel injection, similar methods may be employed in determining direct injector variability in an engine system equipped with a port fuel injection system and a direct fuel injection system.

In this way, by splitting fuel injection into two fuel injections, where the injector is operated in the non-liner region for delivering the first split fuel injection and where the injector is operated in the liner region for delivering the second split fuel injection; varying the split-ratio of the first split fuel injection to the second split fuel injection; and comparing the engine lambda value during the split fuel injections to the nominal lambda value determined during single fuel injection without split-ratio; the correction factor for learning injector variability in the non-linear injector operating region may be determined, and the fuel injector transfer function may be adjusted based on the correction factor. By adjusting the fuel injector transfer function based on the correction factor, fuel injector variability in the non-linear region may be reduced. Consequently, the range of injector operation may be extended, allowing the fuel injector to be operated at pulse widths that were avoided because of non-linear fuel injector behavior. Further, by reducing variability in the non-linear region, engine air-fuel errors may be reduced. As a result, engine emissions may be reduced and catalyst efficiency may be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a cylinder comprising:
during a learning condition,
delivering a first pulse width and a second pulse width to a fuel injector supplying fuel to the cylinder during a cylinder cycle;
varying a ratio of the first pulse width to the second pulse width by decreasing the first pulse width while increasing the second pulse width; and
determining an injector transfer function based on the ratio and an engine lambda value; and
adjusting a control parameter of the injector based on the transfer function.

2. The method of claim 1, wherein the control parameter of the fuel injector is a fuel injector gain, and wherein varying the ratio includes decreasing the first pulse width while increasing the second pulse width by a predetermined amount in a stepwise manner during the learning condition.

3. The method of claim 2, wherein varying the ratio further includes decreasing the first pulse width while increasing the second pulse width until the first pulse width decreases to a minimum pulse width, and further comprising, in response to the first pulse width decreasing to the minimum pulse width, eliminating the second pulse width and operating the fuel injector with a single fuel injection.

4. The method of claim 3, wherein the second pulse width is greater than the first pulse width, and wherein the first pulse width is supplied to the injector for delivering a first fuel injection, and the second pulse width is supplied to the injector for delivering a second fuel injection.

5. The method of claim 4, wherein the first pulse width operates the injector in a ballistic region where flow through the injector is non-linear, and wherein the second pulse width operates the injector in a non-ballistic region.

6. The method of claim 5, wherein the fuel injector is a direct fuel injector, and wherein the first and the second pulse widths are based on obtaining a stoichiometric engine lambda value of one.

7. The method of claim 4, wherein the first fuel injection is delivered prior to the second fuel injection during an intake stroke of the cylinder cycle, and wherein the first and the second fuel injections are separated by a minimum crank angle degree.

8. The method of claim 1, wherein the cylinder is in an engine and, wherein during the learning condition, the engine is operated at a constant speed and air mass.

9. The method of claim 4, wherein the first and the second fuel injections are performed at constant rail pressure during the learning condition.

10. The method of claim 1, further comprising, during the learning condition, varying a fuel injector rail pressure, and at each rail pressure, varying the ratio of the first pulse width to the second pulse width, measuring the engine lambda value for each ratio, and determining a direct fuel injector variability transfer function based on the rail pressure, the ratio and the engine lambda value.

11. A method for operating a fuel injector fueling a cylinder in an engine, comprising:
during a first condition when the engine is operating at a constant speed and air mass,
splitting a desired fuel injection amount into a first fuel fraction and a second fuel fraction; operating the fuel injector at a first pulse width to deliver the first fuel fraction at a first injection timing; and operating the fuel injector at a second pulse width to deliver the second fuel fraction at a second injection timing later than the first injection timing during a cylinder cycle; and
during subsequent cylinder cycles occurring after the cylinder cycle, decreasing a ratio of the first pulse width to the second pulse width by a predetermined amount while maintaining the desired fuel injection amount; measuring an engine lambda value during each cylinder cycle; and learning a fuel injector transfer function based on the lambda value and the ratio;
wherein decreasing the ratio includes decreasing the first pulse width while increasing the second pulse width.

12. The method of claim 11, further comprising, during a second condition, adjusting a control parameter of the fuel injector based on the learnt transfer function; and wherein the second condition is based on one or more of a current engine speed, current engine load, and current torque demand.

13. The method of claim 12, further comprising, operating the fuel injector at a constant rail pressure during the first condition.

14. The method of claim 13, wherein the desired fuel injection amount is based on providing a cylinder air-to-fuel ratio to obtain an engine lambda value of one.

15. The method of claim 11, wherein the fuel injector is a direct fuel injector, and wherein the first pulse width and the second pulse width are delivered during an intake stroke of the cylinder cycle.

16. The method of claim 15, wherein the ratio is decreased stepwise by the predetermined amount until the first pulse width is decreased to a minimum pulse width.

17. The method of claim 11, wherein the first pulse width operates the fuel injector in a non-linear ballistic region, and the second pulse width operates the fuel injector in a non-ballistic region; and wherein the first pulse width and the second pulse width are separated by a crank angle degree.

18. A method for a cylinder including a direct fuel injector, comprising:
during a learning condition,
delivering a nominal fuel injection without split-ratio and a split-ratio fuel injection;
varying the split-ratio by decreasing a first fuel injection fraction of the split-ratio fuel injection while increasing a second fuel injection fraction of the split-ratio fuel injection until the first fuel injection fraction is decreased to a minimum amount; and
comparing a first UEGO output of the nominal fuel injection without split-ratio and a second UEGO output of the split-ratio fuel injection to determine a transfer function correction factor for the fuel injector in the cylinder; and
adjusting a fuel injector parameter based on the determined correction factor;
wherein the fuel injector parameter is a fuel injector transfer function.

19. The method of claim 18, wherein the first fuel injection fraction is delivered prior to the second fuel injection fraction during an intake stroke of a cylinder cycle, and is separated by a minimum crank angle degree, and wherein during the learning condition, an engine including the cylinder is operated with constant air mass and speed.

20. The method of claim 19, wherein the direct fuel injector operates in a ballistic region to deliver the first fuel injection fraction, and wherein the direct fuel injector operates in a non-ballistic region to deliver the second fuel injection fraction.

* * * * *